Sept. 15, 1959   W. D. LEWIS   2,903,812
DUCK DECOY
Filed Aug. 12, 1957

William D. Lewis
INVENTOR.

United States Patent Office 2,903,812
Patented Sept. 15, 1959

2,903,812

DUCK DECOY

William D. Lewis, Syracuse, Kans.

Application August 12, 1957, Serial No. 677,447

4 Claims. (Cl. 43—3)

The present invention relates to a novel and improved duck decoy which is expressly constructed and designed to attract and lure live ducks in a manner and way which will delight duck hunters.

As will be hereinafter more fully appreciated as the nature of the disclosure becomes apparent, an innovation in decoys has been achieved. With a view toward bringing this unique concept to resultfulness, only the hinder or breast posterior (including tail, wings and legs) is presented for viewing above the water surface. Floating, as it does, with the tail substantially straight up in the air or nearly so, the intended quarry will be attracted because of the projected illusion that the decoy is actually a real duck feeding under water in a well recognized or so-called tipping position.

In carrying out the invention a wooden or an equivalent circular base or bottom is provided. This base is self-righting and has a convex bottom. The base carries an upstanding peculiarly shaped body which is designed and constructed to imitate and represent the aforementioned hinder part of a duck. Experience has shown that a decoy such as that herein under consideration is indeed an innovation in the decoy field. It is simple, practical, easy to use and control and is novel in that the material used in the construction of the body is transformed to imitate the desired appearance by reason of the fact that it is molded in a mold which is precision made, having used a real duck to give the mold the exacting impressions desired for transference to the decoy.

Features and advantages in addition to those above set forth will become more readily apparent from the following specification, claims and drawing in which the preferred embodiment of the decoy is revealed.

In the drawing, wherein like numerals are employed to designate like parts, throughout the views.

Figures 1, 2, 3, 4:
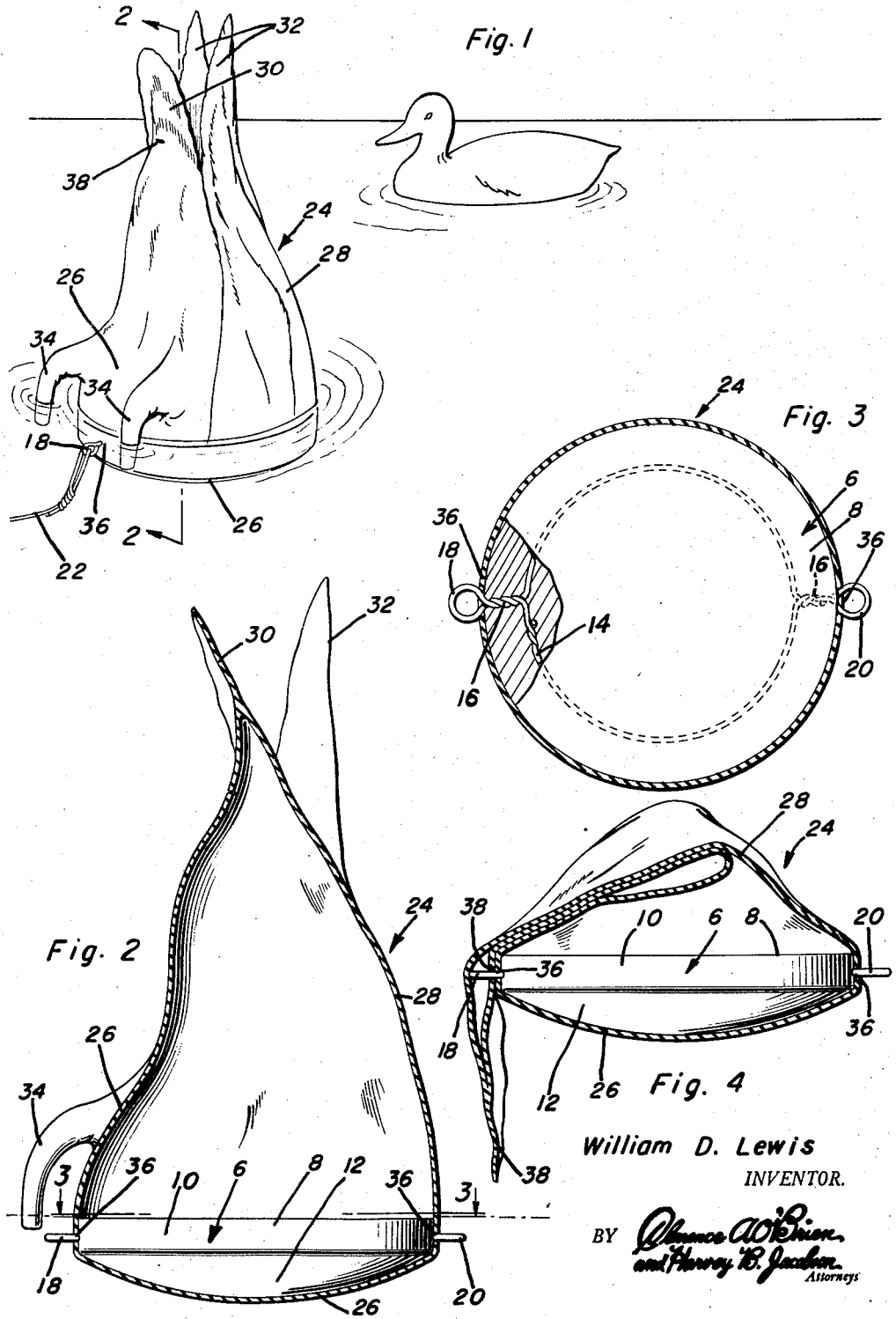
Fig. 1 is a perspective view of the improved duck decoy showing the manner in which it is used.
Fig. 2 is a view in section and elevation on an enlarged scale taken on the plane of the vertical line 2—2 of Fig. 1.
Fig. 3 is a horizontal section, with a portion broken away, taken on the horizontal line 3—3 of Fig. 2.
Fig. 4 is a view in section and elevation similar to Fig. 2 and showing how the collapsible decoy proper may be made compact for carrying, packaging and handling.

The base as stated is circular, self-righting and denoted by the numeral 6 and has a flat top 8 smooth endless vertical rim portion 10 and a convex bottom 12. Embedded in the base as seen in Fig. 3 is a wire or an equivalent reinforcing ring 14 having diametrically opposite twisted portions 16 terminating in diametrically opposite eyes 18 and 20. One eye as seen in Fig. 1 may be used for the attachment thereto of a maneuvering and control line 22.

The decoy proper, also called the body portion, is denoted as an entity by the numeral 24. Because of the originality of the invention it is proper to say here that decoys of this type may be constructed of several different materials such as latex rubber, wood, plastic, plaster of Paris, fibre and so on. By preference latex rubber is employed and this takes the form of what may be described as an envelope or jacket. The bottom portion 26 is stretched across the convex surface of the base and the hollow body portion rises perpendicularly from the base. The numeral 26 designates the ventral side and 28 the dorsal side. The tail is denoted at 30 and the companion wings at 32. The generally L-shaped legs as seen in Fig. 1 are denoted by the numeral 34. This part 24 is also referred to as the hinder part of a duck or alternatively as the breast posterior including tail and wings. The tail being straight up or nearly so while the decoy is floating gives the desired underwater feeding or tipping attitude of the decoy. When using latex rubber it must be of a texture or nature that the inherent properties are erectile so that the decoy normally stands up. On the other hand the properties of the rubber may well be such that the body may be collapsed in the manner seen in Fig. 4. The eyes on the rim extend through slots or apertures 36 and also there is a similar aperture 38 formed in the tail portion and which may be hooked over the eye 18 in the manner illustrated in Fig. 4.

Repeating, the gist or essence of the invention is in the provision of a unique "puddle" duck decoy which in use assumes a tipping position representing or imitating a duck feeding under water. The hinder part visible above the water is that part which is approximately the breast posterior to and including the tail and wings. The central idea however is the decoy in the tipping position illustrated regardless of the material employed in the construction of the base or body. It is to be pointed out that in the construction of these decoys I have used a body of a real duck as the model to make the molds from.

A precision impression has been taken from the posterior part of the duck with plaster of Paris. Consequently the decoy is in true likeness of a real duck.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A duck decoy comprising a circular buoyant base having a convex bottom, diametrically opposite eyes projecting radially from the periphery of the base and carried by a metal reinforcing ring embedded in the base, a hollow rubber molded jacket enclosing said base and having a vertically elongated body portion tapering upwardly and rising perpendicularly above and in alignment with the base, said body portion being exteriorly shaped to represent the hinder portion only of a real duck, said eyes piercing adjacent portions of the jacket and projecting therebeyond for use, said rubber jacket being collapsible by hand and having a slit at the apical end portion which may be temporarily hooked over one of said eyes.

2. A duck decoy comprising a buoyant base adapted to float atop a body of water, a decoy body attached to and rising vertically from said base, said decoy body being designed and otherwise constructed to accurately represent and imitate the hinder part only of an actual duck, giving an observer the illusion that a real duck feeding in an underwater or tipping position is present, a control line under the control of a user of the decoy, and means on a marginal portion of said base whereby an adjacent end portion of the line may be attached to the base, the top of said base being flat and the bottom of said base being convex.

3. A duck decoy comprising a buoyant base adapted to float atop a body of water, a decoy body attached to and rising perpendicularly above said base, said decoy body being designed and otherwise constructed from moldable material to accurately represent and imitate the hinder part only of an actual duck, said hinder part embodying the posterior portion of the breast, tail, wings and legs, whereby to attract and lure live ducks, giving the quarry the illusion that a real duck feeding in an underwater or tipping position is present, said base being circular in plan, and a wire reinforcing ring embedded in said base, said ring being provided at diametrically opposite portions with eyes and said eyes projecting radially beyond the peripheral edge of the base.

4. A duck decoy comprising a buoyant base adapted to float atop a body of water, a decoy body attached to and rising perpendicularly above said base, said decoy body being designed and otherwise constructed from moldable material to accurately represent and imitate the hinder part only of an actual duck, said hinder part embodying the posterior portion of the breast, tail, wings and legs, whereby to attract and lure live ducks, giving the quarry the illusion that a real duck feeding in an underwater or tipping position is present, said base being circular in plan and having a wire reinforcing ring embedded therein, said ring being provided with diametrically opposite eyes radiating beyond the peripheral edge of the ring, said decoy body being hollow and made from rubber having inherent erectile and self-shaping and shape retention properties such that said body normally assumes an erect decoy-performing state.

References Cited in the file of this patent
UNITED STATES PATENTS 2,457,295 Woodhead Dec. 28, 1948